(12) United States Patent
Kang et al.

(10) Patent No.: US 11,888,541 B2
(45) Date of Patent: Jan. 30, 2024

(54) METHODS AND SYSTEMS FOR DETERMINING SPECTRAL INTERFERENCE

(71) Applicant: RAKUTEN MOBILE, INC., Tokyo (JP)

(72) Inventors: Kang Kang, Tokyo (JP); Youngbin Kim, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 238 days.

(21) Appl. No.: 17/455,205

(22) Filed: Nov. 16, 2021

(65) Prior Publication Data

US 2022/0337327 A1    Oct. 20, 2022

Related U.S. Application Data

(60) Provisional application No. 63/175,528, filed on Apr. 15, 2021.

(51) Int. Cl.
*H04B 17/345* (2015.01)
*H04B 17/391* (2015.01)

(52) U.S. Cl.
CPC ......... *H04B 17/345* (2015.01); *H04B 17/391* (2015.01)

(58) Field of Classification Search
CPC ............................ H04B 17/345; H04B 17/391
See application file for complete search history.

(56) References Cited

U.S. PATENT DOCUMENTS

2012/0057540 A1*  3/2012  Fang ................. H04B 7/063
                                                  370/328

* cited by examiner

*Primary Examiner* — Natasha W Cosme
(74) *Attorney, Agent, or Firm* — HAUPTMAN HAM, LLP

(57) ABSTRACT

A method and system of determining spectral interference are disclosed. In one embodiment, a spectral interference model for a first set of proposed base stations is obtained. The spectral interference model is implemented for the first set of proposed base stations to calculate first modeled spectral interference values, wherein each of the first modeled spectral interference values indicates a spectral interference value for a corresponding one of the first set of proposed base stations. The first set of proposed base stations are updated based on the first modeled spectral interference values to obtain a second set of proposed base stations. First empirical spectral interference values are then obtained for a first proper subset of the second set of proposed base stations. The first empirical spectral interference values are compared with the modeled spectral interference values and the second set of proposed base stations are updated based on the comparison.

20 Claims, 9 Drawing Sheets

| Base Station ID | Latitude (°) | Longitude (°) | Antenna Height (m) | Transmission Power (dBm) | Azimuth (°) | Zenith (°) | Bandwidth (MHz) | Antenna Pattern |
|---|---|---|---|---|---|---|---|---|
| 102A | 35.663423 | 139.808694 | 17.80 | 3.4 | 30.00 | 8.00 | 100 | Nokia |
| 102B | 35.666825 | 139.702425 | 46.70 | 3.4 | 220.00 | 18.00 | 100 | Nokia |
| 102C | 35.669827 | 139.682063 | 16.95 | 3.4 | 100.00 | 16.00 | 100 | Nokia |
| 102D | 35.659519 | 139.698989 | 31.50 | 3.4 | 110.00 | 6.00 | 100 | Nokia |
| 102E | 35.659417 | 139.698722 | 31.50 | 3.4 | 230.00 | 6.00 | 100 | Nokia |
| 102F | 35.745328 | 139.753811 | 12.88 | 3.4 | 20.00 | 2.00 | 100 | Nokia |
| 102G | 35.640900 | 139.744461 | 39.47 | 3.4 | 40.00 | 6.00 | 100 | Nokia |
| 102H | 35.605758 | 139.679892 | 14.10 | 3.4 | 340.00 | 4.00 | 100 | Nokia |
| 102I | 35.748415 | 139.756526 | 20.79 | 3.4 | 70.00 | 4.00 | 100 | Nokia |

FIG. 3

| Position ID | Modeled Spectral Interference Value (dBm/MHz) |
|---|---|
| 102A | -184.0383735 |
| 102B | -174.3968142 |
| 102C | -156.1153704 |
| 102D | -141.1531646 |
| 102E | -199.0089115 |
| 102F | -145.5537975 |
| 102G | -158.9746369 |
| 102H | -175.8978184 |
| 102I | -166.2410035 |
| 102J | -139.6443738 |

FIG. 4

| Base Station ID | Empirical Spectral Interference Value (dBm/mHz) | Modeled Spectral Interference Value (dBm/mHz) |
|---|---|---|
| 102A | -185.129 | -184.038 |
| 102D | -170.358 | -174.397 |
| Total | -170.216 | -173.949 |
| Difference | | 3.733 |

FIG. 7

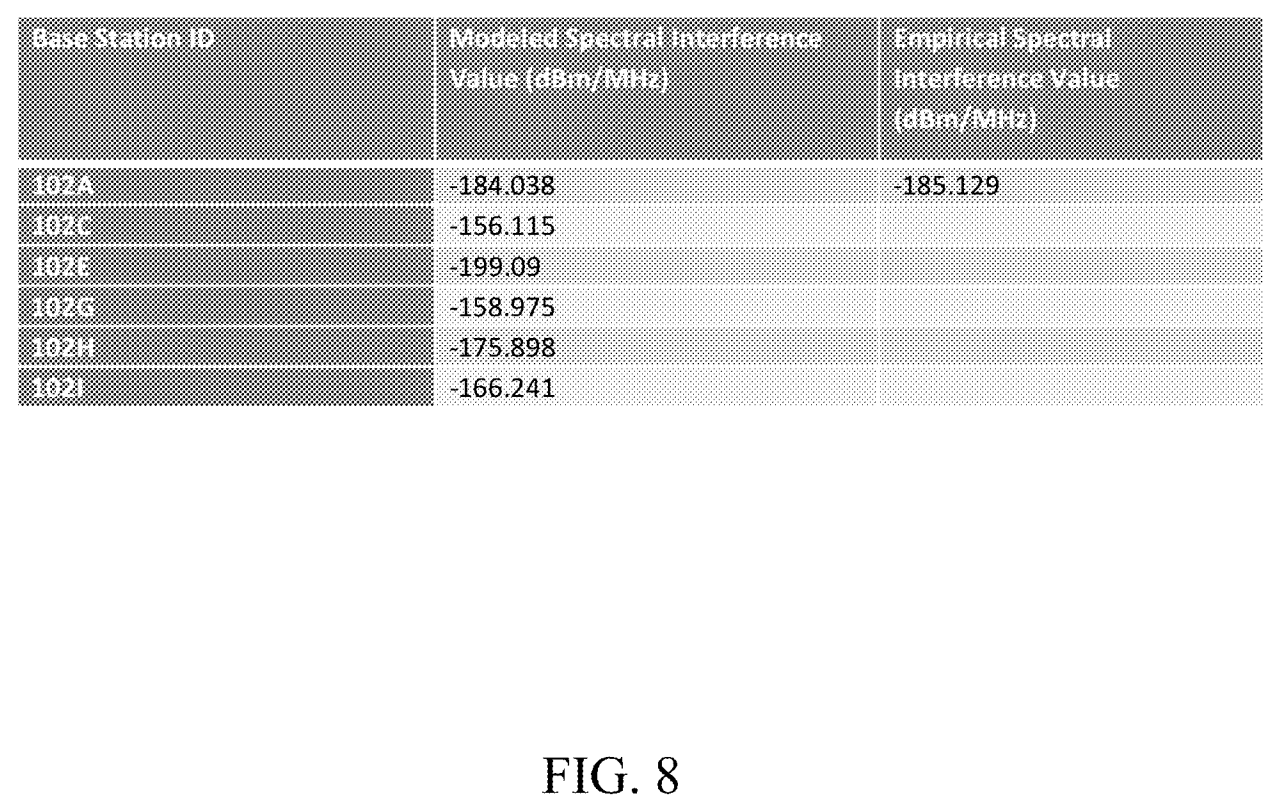

| Base Station ID | Modified Spectral Interference Value (dBm/MHz) | Empirical Spectral Interference Value (dBm/MHz) |
|---|---|---|
| 1074A | -184.038 | -185.129 |
| 1074C | -156.115 | |
| 1074E | -199.09 | |
| 1074G | -158.975 | |
| 1074I | -175.898 | |
| 1092 | -166.241 | |

FIG. 8

METHODS AND SYSTEMS FOR DETERMINING SPECTRAL INTERFERENCE

PRIORITY CLAIM AND CROSS-REFERENCE

This application claims priority to Provisional Application No. 63/175,528, filed Apr. 15, 2021, which is hereby incorporated by reference in its entirety.

BACKGROUND

When a provider of cellular network is planning to install new base stations, government regulators often request information regarding the effects of spectral interference prior to allowing for the new base stations to be installed. The frequency spectrum for wireless cellular networks is limited and is often reused in different types of frequency reuse techniques. Unfortunately, these frequency reuse techniques are often result in spectral interference. Thus, a cellular network provider has to provide an accurate estimate of spectral interference prior to the government regulator granting the cellular network provider a license to install the new base stations. In this manner, the government regulator can determine whether the spectral interference of the proposed base stations is maintained at acceptable levels.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a table of parameters that are defined when implementing a computer model of proposed base stations according to one or more embodiments.

FIG. 4 is a table of the modeled spectral interference values associated with the first set of the proposed base stations after the implementation of the computer model according to one or more embodiments.

FIG. 7 is a table demonstrating a comparison of empirical spectral interference values obtained for a first proper subset of the second set of the proposed base stations according to one or more embodiments.

FIG. 8 is a table demonstrating the proposed base stations to be set up after the second set of proposed base stations are updated based on the comparison according to one or more embodiments.

DETAILED DESCRIPTION

Figure 1:
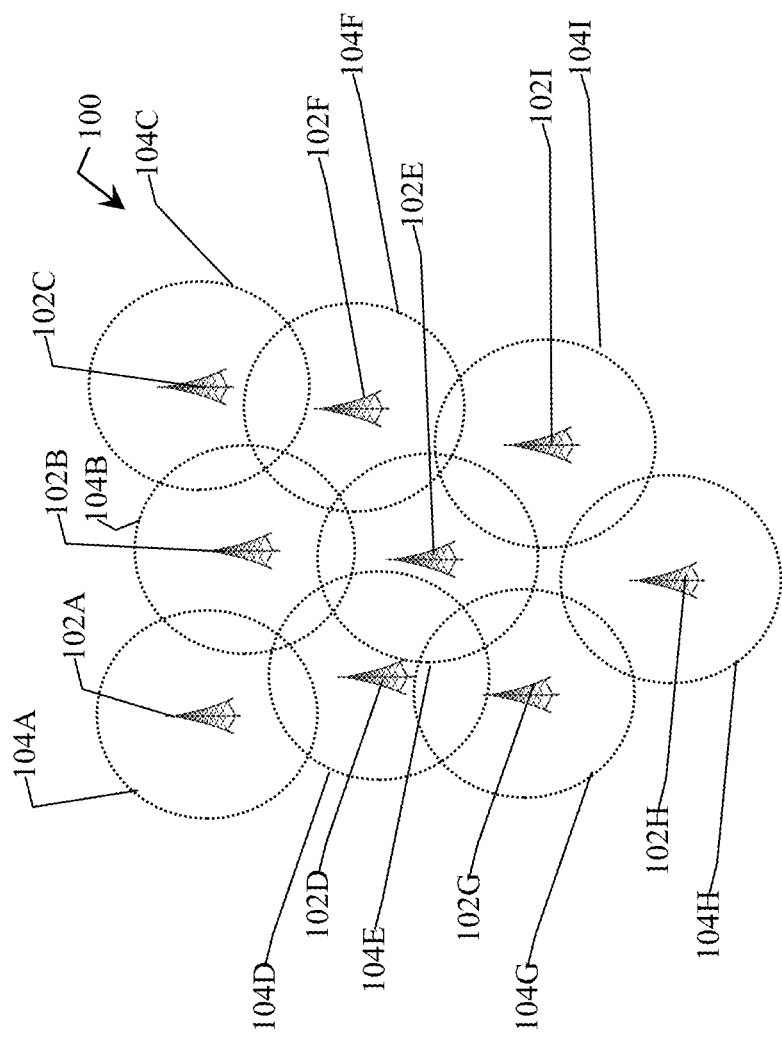
FIG. 1 is a diagram of a first set of proposed base stations according to one or more embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Methods and systems for determining spectral interference are disclosed. In some embodiments, modeled spectral interference values are obtained for a set of proposed base stations. The modeled spectral interference values serve as references for empirical spectral interference values that are obtained for one or more of the proposed base stations. Obtaining empirical spectral interference values for proposed base stations can be a slow and expensive process and thus, in some embodiments, not all of the empirical spectral interference values are obtained for all of the proposed base stations. In this case, the modeled spectral interference values are compared to the modeled interference values to determine which of the proposed base station will actually be set up.

FIG. 1 is a diagram of a first set of base stations 102A, 102B, 102C, 102D, 102E, 102F, 102G, 102H, 102I (referred to collectively or generically as base station(s) 102) according to one or more embodiments.

Base stations 102 represent proposed base stations 102. Proposed base stations have not all been installed but are being proffered for installation. In some embodiments, a provider of a cellular network intends to install base stations 102 in a new coverage area. In some embodiment, the cellular network provider intends to install reconfigure a coverage area. In some embodiments, all of base stations 102 that are proposed base stations have not yet been installed. In some embodiments, one or more of base stations 102 are already installed but a proper subset of the base stations 102 have not been installed. Instead, the proper subset of base stations 102 are being proffered for installation. Accordingly, in some embodiments, some of base stations 102 in proposed base stations 102 have been installed and a proper subset of proposed base stations 102 have not been installed. A "proper subset" of a set means that all members of the subset are members of the set but at least one member of the set is not a member of the subset. In other words, at least one member of the set is not provided in the "proper subset."

In some embodiments, when a cellular network provider wants to install proposed base stations 102, where at least some of proposed base stations 102 have not been installed, the cellular network provider has to apply for a license with the appropriate governmental institution. One of the issues faced by the cellular network provider when apply for a government license is providing the government institution with a sufficiently accurate estimation of the spectral interference that will be experienced by proposed base stations 102. As shown in FIG. 1, proposed base station 102A provides wireless cellular coverage to a cell 104A. A cell is a geographic area that the base station provides wireless cellular communication services. Proposed base station 102B provides wireless cellular coverage to a cell 104B. Proposed base station 102C provides wireless cellular coverage to a cell 104C. Proposed base station 102D provides wireless cellular coverage to a cell 104D. Proposed base station 102E provides wireless cellular coverage to a cell 104E. Proposed base station 102F provides wireless cellular coverage to a cell 104F. Proposed base station 102G provides wireless cellular coverage to a cell 104G. Proposed base station 102H provides wireless cellular coverage to a cell 104H. Finally, proposed base station 102I provides wireless cellular coverage to a cell 104I. Cell 104A, 104B, 104C, 104D, 104E, 104F, 104G, 104H, 104I are referred to generically or collectively as cell(s) 104.

As shown in FIG. 1, at least some of cells 104 partially overlap, which results in coverage areas that receive service from multiple proposed base stations 102. Furthermore, in some embodiments, proposed base stations 102 transmit and receive radio frequency (RF) signals within the same spectral frequencies. The limited frequency spectrum allocated for a cellular system results in crowded communication channels as cellular network providers face the extraordinary increasing demand for cellular communication services. Multiple access and channel assignment are mostly used techniques to maximize the efficient use of the available RF spectrum. Frequency reuse techniques are used in wireless cellular networks to improve capacity. This implies that the frequencies used to serve one of cells 104 are reused to serve a different one of cells 104. This introduces spectral interference between base stations 102 that use the same channels. In some embodiments, spectral interference results in decreasing service quality and system capacity of base stations 102.

Accordingly, a cellular network provider has to estimate the spectral interference of proposed base stations 102 in order to apply for a government license. One of the problems with providing a sufficiently accurate estimate of spectral interference is the difficulty of obtaining empirical spectral interference values. Setting up test equipment is slow and significantly slows down the process. Thus, this disclosure provides techniques for more quickly providing spectral interference estimations in order to apply for government licenses.

Figure 2:
FIG. 2 is a flowchart of determining spectral interference for a set of proposed base stations according to one or more embodiments.

FIG. 2 is a flowchart 200 of determining spectral interference for a set of proposed base stations, such as the proposed base station 102 shown in FIG. 1, according to one or more embodiments.

Figure 9:
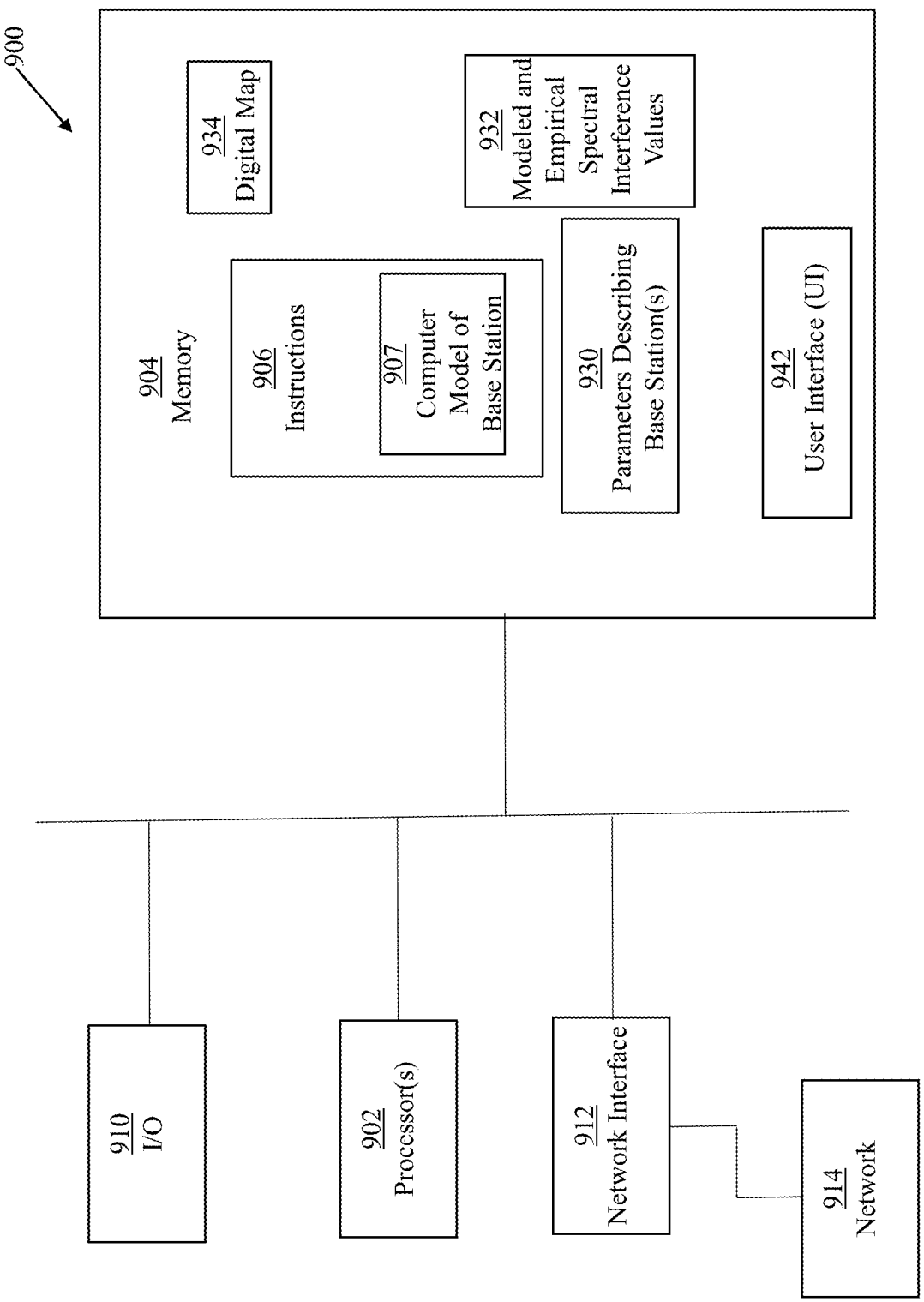
FIG. 9 is a block diagram of a computing device, in accordance with one or more embodiments.

In some embodiments, the method in flowchart 200 is implemented by at least one computer device, such as computer device 900 described in FIG. 9. At block 202, a spectral interference model for the first set of proposed base stations is obtained. The spectral interference model is a computer model that mathematically estimates the spectral behavior of the proposed base stations.

In some embodiments, the computer model uses three inputs to estimate the spectral interference: transmitter, receiver and channel model. The input parameters of transmitter include latitude, longitude, antenna height, antenna pattern, transmission power, bandwidth, azimuth, and zenith. The input parameters of receiver include latitude, longitude, antenna height, antenna pattern, azimuth, and zenith. In some embodiments, the channel model is a "free space pathloss model", which assumes signals travel through vacuum. In other embodiments, environmental factors are taken into consideration. On such model is the Okumura-Hata model. One embodiment that is highly accurate is a ITU-R.P 452 model. ITU-R.P 452 models considers diffraction loses, atmospheric scattering and refraction, rain scattering, signal channeling and clutter loss. In some embodiments, an ITU-R.P 452 model is preferred.

At block 204, the spectral interference model is implemented for the first set of proposed base stations to calculate first modeled spectral interference values, wherein each of the first modeled spectral interference values indicates a spectral interference value for a corresponding one of the first set of proposed base stations. Thus, each of the base stations is associated with a modeled spectral interference value from the first spectral interference values. Each of the first modeled spectral interference values provides an estimate of spectral interference for each of the proposed base stations. The first modeled spectral interference values provide a reference to judge each of the proposed based stations. From block 204, flow proceeds to block 206.

At block 206, the first set of proposed base stations are updated based on the first spectral interference values to obtain a second set of proposed base stations. In some embodiments, first spectral interference values are compared to a threshold value. For example, the first spectral interference values are accumulated to calculate a total spectral interference value. The total spectral interference value is compared with the threshold value. If the total spectral interference value is greater or equal to the threshold value, then proposed base stations with the highest spectral interference values are removed from the set until the total spectral interference values are under the threshold value. In this manner, the first set of proposed base stations is updated to provide the second set of proposed base stations. From block 206, flow proceeds to block 208.

At block 208, first empirical spectral interference values are obtained for a first proper subset of the second set of proposed base stations. Thus, empirical spectral interference values are obtained for less than all of the proposed base stations. To obtain the empirical spectral interference values, test equipment is set up to obtain measurements that estimate the spectral interference experienced by a proposed based station. As this is a slow process, empirical spectral interference values are not obtained for all of the proposed base stations. Accordingly, the modeled spectral interference values and the empirical spectral interference values are used to judge whether one or more of the proposed base stations is tenable. From block 208, flow process to block 210.

At block 210, the first empirical spectral interference values are compared with a subset of the first modeled spectral interference values that correspond with the first proper subset of the second set of proposed base stations. Thus, the empirical spectral interference values are compared with the subset of the modeled spectral interference values of the proposed base stations that have empirical spectral interference values. In some embodiments, the empirical spectral interference values are accumulated and the subset of modeled spectral interference values are accumulated. If the between accumulated empirical spectral interference values and the accumulated subset of modeled spectral interference values is under a threshold, the proposed base stations are acceptable. If not, the proposed base stations with the highest empirical interference values are considered unacceptable. From block 210, flow proceeds to block 212.

At block 212, the second set of proposed base stations are updated as base stations to be set up based on the comparison. In some embodiments, if the difference between accumulated empirical spectral interference values and the accumulated subset of modeled spectral interference values is under a threshold value, then all of the second set of proposed base stations are acceptable and the second set of proposed base stations are base stations to be set up. However, if the difference between accumulated empirical spectral interference values and the accumulated subset of modeled spectral interference values is greater or equal a threshold value, the base stations with the highest empirical spectral values are removed until the difference is under the threshold.

At block 214, instructions to install the updated second set of proposed base stations are transmitted to installation personnel and/or the updated second set of proposed base stations are installed. In some embodiments, the instructions provide a description of the updated second set of proposed base stations, which allow installation personnel to identify the location and characteristics of the proposed base stations to be installed. In some embodiments, the updated second set of proposed base stations are installed as actual base stations once the appropriate approval is provided from the appropriate government authority. In some embodiments, installation personnel install the proposed base stations in accordance with the instructions.

FIG. 3 is a table that illustrates parameters that are defined when implementing block 202 of FIG. 2 according to one or more embodiments.

In order to model the spectral interference of proposed base stations 102 (See FIG. 1), relevant parameters describing their configuration are provided as inputs into a computer model of proposed base stations 102. In FIG. 3, the parameters included for each of the proposed base stations include a location of the proposed base station 102, an antenna height of an antenna of the proposed base station 102, transmission power of the proposed base station 102, an azimuth for the antenna of the proposed base station 102, a zenith of the antenna of the proposed base station 102, a bandwidth of the proposed base station 102, and an antenna pattern of the proposed base station. In some embodiments, the location of each of the base stations 102 is provided by a latitude and a longitude. The directionality of the antenna is provided through the azimuth and the zenith. In this example, the bandwidth of each of the proposed base stations is 100 MHz. Bandwidth of the base station 102 depends on the band station type and parameter settings for the base station 102. In other embodiments, at least some of the bandwidths of the proposed base stations are different than one another. Furthermore, in some embodiments, the antenna pattern can be identified by the manufacturer or brand of the antenna. In this embodiment, each of the antenna is provided by Nokia. In some embodiments, additional parameters are included that are relevant to the computer model such as antenna type, signal types, and/or the like.

In some embodiments, the computer model of proposed base station 102 a digital map is obtained that digitally describes a topography surrounding the first set of proposed base stations 102. In some embodiments, the digital map is stored in memory and obtained for processing by at least one processor. In some embodiments, the digital map is obtained through a network from a separate device. The digital map digitally describes the topography of cells 104 (See FIG. 2) that define the coverage area of base stations 102.

FIG. 4 is a table of the modeled spectral interference values associated with the first set of proposed base stations 102 after the implementation of block 204 in FIG. 2 according to one or more embodiments.

As a result of the implementing the spectral interference model of proposed base stations 102 (See FIG. 2), the spectral interference model outputs a set of modeled spectral interference values for each of proposed base stations 102, as shown in FIG. 4. Each of the modeled spectral interference values estimates the spectral interference that would be experienced by each of proposed base stations 102.

With respect to block 206, the modeled spectral interference values are accumulated to obtain a total modeled spectral interference value for the set of proposed base stations 102. In the table shown in FIG. 4, this is shown in the Total entry (by adding the dBm/MHz values). The total modeled spectral interference value in this example equals to −139.6443738.

When the total modeled spectral interference values are greater than a threshold value, the second set of proposed base stations is obtained by removing one or more proposed base stations 102 from the set of proposed base stations 102. Proposed base stations 102 correspond to a highest one or more of the modeled spectral interference values so that remaining ones of the modeled spectral interference values corresponding to the second set of proposed base stations 102 total to less than or equal to the threshold value. For example, assuming that the threshold value is −145 dBm/MHz. Accordingly, the total modeled spectral interference value is −139.6443738 dBm/MHz. Accordingly, the total modeled spectral interference value is greater than the threshold value. Therefore, proposed base stations 102 with the highest modeled spectral interference values are removed until the total modeled spectral interference value is less than the threshold value. In this case, proposed base stations 102 with the highest modeled spectral interference values are proposed base station 102D and proposed base station 102E.

Figure 5:
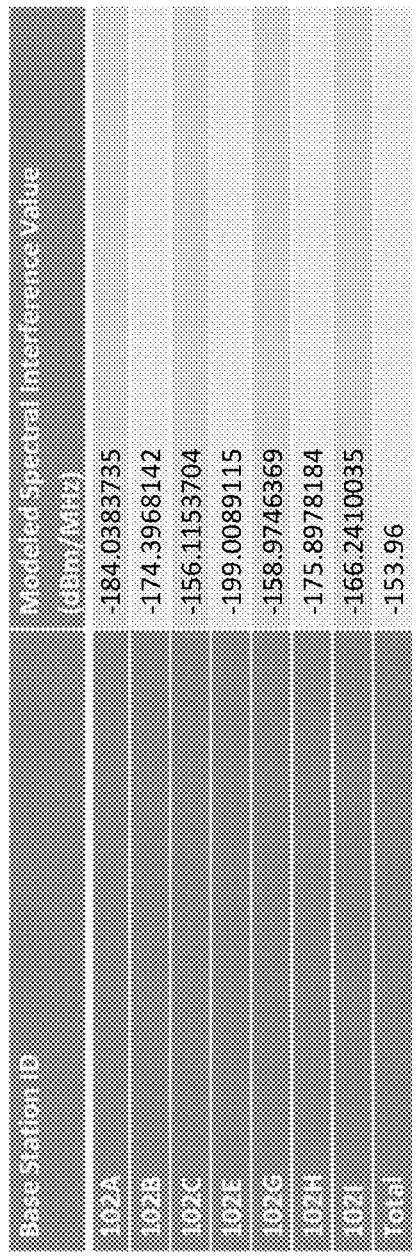
FIG. 5 is a table of the modeled spectral interference values associated with a second set of the proposed base stations after the first set of proposed base stations is updated based on the modeled spectral interference values according to one or more embodiments.

FIG. 5 is a table of the modeled spectral interference values associated with the second set of proposed base stations 102 (See FIG. 2) after the implementation of block 206 in FIG. 2 according to one or more embodiments.

Once proposed base station 102D and proposed base station 102F are removed to provide the second set of proposed base stations 102, the total modeled spectral interference value is −153.96 dBm/MHz, which is below the threshold value. Accordingly, the second set of proposed base stations 102 includes all of base stations 102 except proposed base station 102D and proposed base station 102F. Accordingly, proposed base station 102 remaining in the second set of proposed base stations 102 have a total modeled spectral interference value (−153.96 dBm/MHz) that is less than the threshold value −145 dBm/MHz.

Figure 6:
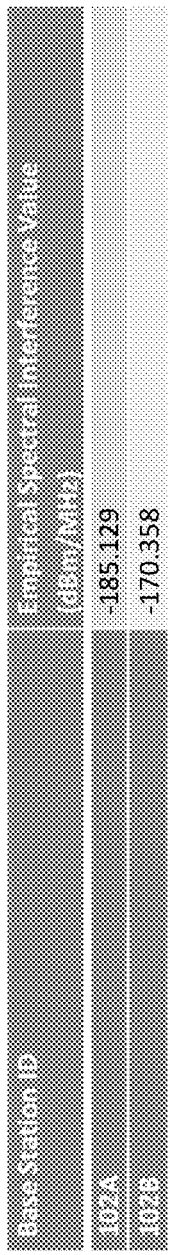
FIG. 6 is a table of empirical spectral interference values obtained for a proper subset of the second set of the proposed base stations according to one or more embodiments.

FIG. 6 is a table of empirical spectral interference values obtained for a first proper subset of the second set of proposed base stations 102 (See FIG. 2) after the implementation of block 208 in FIG. 2 according to one or more embodiments.

Thus, empirical spectral interference values are obtained for less than all of proposed base stations 102 in the second set of proposed base stations 102 (See FIG. 6). In some embodiments, empirical spectral interference values are obtained for proposed base stations 102A, 102B.

In some embodiments, test equipment is set up for each proposed base station in the proper subset of the second set of proposed base stations. Spectral interference is then measured with the test equipment for each of the proposed base station in the proper subset of the second set of proposed base stations to obtain the empirical spectral interference values.

In other embodiments, personnel for the cellular network provider the location of the proposed base stations 102. For example, the personnel visit the rooftop of a building that will include the base station. At the location of the proposed base stations, the personnel measure the exact latitude/longitude where the proposed base station, check the designed antenna height for feasibility, and check that the designed direction will not be blocked by other objects (e.g., neighboring buildings). The personnel can also check to ensure that the location is strong enough to support the proposed base station. The parameters obtained for the proposed base station are provided as data and run through the computer model to obtain the empirical spectral interference values.

FIG. 7 is a table demonstrating a comparison of empirical spectral interference values obtained for a first proper subset of the second set of the proposed base stations 102 (See FIG. 2) after the implementation of block 210 in FIG. 2 according to one or more embodiments.

In some embodiments, the total empirical spectral interference value is −170.216 dBm/MHz and the total modeled spectral interference value is −173.949 dBm/MHz for base stations 102A, 102B. The total empirical spectral interference value is −170.216 dBm/MHz and the total modeled spectral interference value is −173.49 dBm/MHz and thus the difference is 3.733 dB. In this case, a threshold value is 2 dB. If the difference between the total empirical spectral interference value (e.g., −170.216 dBm/MHz) and the total modeled spectral interference value (e.g., −173.49 dBm/MHz) is greater than 2 dB, one or more of base stations 102A, 102B should be dropped until the difference between the total empirical spectral interference value and the total modeled spectral interference value is less than 2 dB. In other embodiments, the threshold value is a value different than 2 dB.

FIG. 8 is a table demonstrating proposed base stations 102 (See FIG. 2) to be set up after the second set of proposed base stations 102 are updated based on the comparison after implementing block 212 in FIG. 2 according to one or more embodiments.

In this case, proposed base station 102B is dropped from the second set of proposed base stations 102. When proposed base station 102B is dropped, the only remaining with an empirical spectral interference value is base station 102A. The difference between the empirical spectral interference value and the modeled spectral interference value for base station 102A is 1.091 dB, which is less than 2 dB. Therefore, remaining proposed base stations of 102A, 102C, 102E, 102G, 102H, and 102I are base stations 102 that are proposed for set up.

FIG. 9 is a block diagram of a general purpose computing device 900 in accordance with one or more embodiments.

Computing device 900 is configured to implement blocks 202-212 in FIG. 2. In some embodiments, computing device 900 is a general purpose computing device including at least one hardware processor 902 and a non-transitory, computer-readable storage medium 904. Storage medium 904, amongst other things, is encoded with, i.e., stores, computer program code 906, i.e., a set of computer-executable instructions. Execution of instructions 906 by hardware processor 902 that implements a portion or all of the methods described herein in accordance with one or more embodiments (hereinafter, the noted processes and/or methods). Storage medium 904, amongst other things computer program code 906. Computer program code 906 includes instructions for a computer model 907 of a base station which mathematically mimic the behavior of the base station in order to obtain modeled spectral interference values for the proposed base stations.

Processor 902 is electrically connected to non-transitory computer-readable storage medium 904 via a bus 908. Processor 902 is also electrically connected to an I/O interface 910 by bus 908. A network interface 912 is also electrically connected to processor 902 via bus 908. Network interface 912 is connected to a network 914, so that processor 902 and computer-readable storage medium 904 are capable of connecting to external elements via network 914. Processor 902 is configured to execute computer program code 906 encoded in computer-readable storage medium 904 in order to cause system 900 to be usable for performing a portion or all of the noted processes and/or methods. In one or more embodiments, processor 902 is a central processing unit (CPU), a multi-processor, a distributed processing system, an application specific integrated circuit (ASIC), and/or a suitable processing unit.

In one or more embodiments, computer-readable storage medium 904 is an electronic, magnetic, optical, electromagnetic, infrared, and/or a semiconductor system (or apparatus or device). For example, computer-readable storage medium 904 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 904 includes a compact disk-read only memory (CD-ROM), a compact disk-read/write (CD-R/W), and/or a digital video disc (DVD).

In one or more embodiments, storage medium 904 stores computer program code 906 configured to cause computing device 900 (where such execution represents (at least in part) the EDA tool) to be usable for performing a portion or all of the noted processes and/or methods. In one or more embodiments, storage medium 904 also stores information which facilitates performing a portion or all of the noted processes and/or methods. Storage medium 904 further stores parameters 930 that describe particular implementations of the proposed base stations. Stored parameters 930 serve as input into computer model 907 in order to obtain the modeled spectral interference values. An example of stored parameters are provided in FIG. 3. Additionally, a digital map 934 describing the topographical surroundings of the proposed base stations is stored in storage medium 904. Digital map 934 also serves as an input to computer model 907. Storage medium 904 also stores modeled and empirical spectral values, which are described in FIG. 4-FIG. 8.

Computing device 900 includes I/O interface 910. I/O interface 910 is connected to external circuitry. In one or more embodiments, I/O interface 910 includes a keyboard, keypad, mouse, trackball, trackpad, touchscreen, and/or cursor direction keys for communicating information and commands to processor 902.

Computing device 900 also includes network interface 912 connected to processor 902. Network interface 912 allows computing device 900 to communicate with network 914, to which one or more other computer systems are connected. Network interface 912 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 900.

Computing device 900 is configured to receive information through I/O interface 910. The information received through I/O interface 910 includes one or more of instructions, data, and/or other parameters for processing by processor 902. The information is transferred to processor 902 via bus 908. Computing device 900 is configured to receive information related to a UI through I/O interface 910. The information is stored in computer-readable medium 904 as user interface (UI) 942.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of determining spectral interference, comprising:
    obtaining a spectral interference model for a first set of proposed base stations;
    implementing the spectral interference model for the first set of proposed base stations to calculate first modeled spectral interference values, wherein each of the first modeled spectral interference values indicates a spectral interference value for a corresponding one of the first set of proposed base stations;
    updating the first set of proposed base stations based on the first modeled spectral interference values to obtain a second set of proposed base stations;
    obtaining first empirical spectral interference values for a first proper subset of the second set of proposed base stations;
    comparing the first empirical spectral interference values with a subset of the first modeled spectral interference values that correspond with the first proper subset of the second set of proposed base stations; and
    updating the second set of proposed base stations as base stations to be set up based on the comparison.

2. The method of claim 1, wherein obtaining the spectral interference model for a first set of proposed base stations, comprises:
    for each proposed base station of the first set of proposed base stations, defining more than one of the following:
        a location of the proposed base station, an antenna height of an antenna of the proposed base station, transmission power of the proposed base station, an azimuth for the antenna of the proposed base station, a zenith of the antenna of the proposed base station.

3. The method of claim 2, wherein obtaining the spectral interference model for a first set of proposed base stations, further comprises:
    obtaining a digital map that digitally describes a topography surrounding the first set of proposed base stations.

4. The method of claim 1, wherein updating the first set of proposed base stations based on the first spectral interference values to obtain the second set of proposed base stations, comprises:
    accumulating the first modeled spectral interference values to obtain a total modeled spectral interference value for the first set of proposed base stations;
    comparing the total modeled spectral interference value and a threshold value; and
    obtaining the second set of proposed base stations by removing one or more proposed base stations from the first set of proposed base stations that correspond to a highest one or more of the first modeled spectral interference values so that remaining ones of the first modeled spectral interference values corresponding to the second set of proposed base stations total to less than or equal to the threshold value.

5. The method of claim 1, wherein obtaining first empirical spectral interference values for the first proper subset of the second set of proposed base stations, comprising:
    setting up test equipment for each proposed base station in the first proper subset of the second set of proposed base stations;
    measuring spectral interference with the test equipment for each of the proposed base station in the first proper subset of the second set of proposed base stations to obtain the first empirical spectral interference values.

6. The method of claim 1, wherein comparing the first empirical spectral interference values with the subset of the first modeled spectral interference values that correspond with the first proper subset of the second set of proposed base stations, comprises:
    accumulating the first empirical spectral interference values to obtain a total empirical spectral interference value;
    accumulating the subset of the first modeled spectral interference values that correspond with the first proper subset of the second set of proposed base stations to obtain a total modeled spectral interference value;
    calculating the total empirical spectral interference value minus the total modeled spectral interference value to obtain a difference value; and
    determining whether the difference value is greater than a threshold value.

7. The method of claim 6, wherein updating the second set of proposed base stations as base stations to be set up based on the comparison, comprises:
    removing one or more proposed base stations in the first proper subset from the second set of proposed base stations that correspond to a highest one or more of the first spectral interference values so that remaining ones of the first empirical spectral interference values corresponding to the second set of proposed base stations total to less than or equal to the threshold value.

8. The method of claim 1, further comprising providing instructions for installing the updated second set of proposed base stations.

9. A system, comprising:
a non-transitory computer readable medium that stores computer executable instructions;
at least one processor operably associated with the non-transitory computer readable medium, wherein, when the at least one processor executes the computer executable instructions, the at least one processor is configured to:
   obtain a spectral interference model for a first set of proposed base stations;
   implement the spectral interference model for the first set of proposed base stations to calculate first modeled spectral interference values, wherein each of the first modeled spectral interference values indicates a spectral interference value for a corresponding one of the first set of proposed base stations;
   update the first set of proposed base stations based on the first spectral interference values to obtain a second set of proposed base stations;
   obtain first empirical spectral interference values for a first proper subset of the second set of proposed base stations;
   compare the first empirical spectral interference values with a subset of the first modeled spectral interference values that correspond with the first proper subset of the second set of proposed base stations; and
   update the second set of proposed base stations as base stations to be set up based on the comparison.

10. The system of claim 9, wherein, when executing the computer executable instructions the at least one processor is configured to obtaining the spectral interference model for a first set of proposed base stations by:
   for each proposed base station of the first set of proposed base stations, defining more than one of the following:
   a location of the proposed base station, an antenna height of an antenna of the proposed base station, transmission power of the proposed base station, an azimuth for the antenna of the proposed base station, a zenith of an antenna of the proposed base station.

11. The system of claim 10, wherein when executing the computer executable instructions, the at least one processor is configured to obtain the spectral interference model for a first set of proposed base stations by:
   obtaining a digital map that digitally describes a topography surrounding the first set of proposed base stations.

12. The system of claim 9, wherein when executing the computer executable instructions the at least one processor is configured to update the first set of proposed base stations based on the first spectral interference values to obtain the second set of proposed base stations by:
   accumulating the first spectral interference values to obtain a total spectral interference value for the first set of proposed base stations;
   comparing the total spectral interference value and a threshold value; and
   obtaining the second set of proposed base stations by removing one or more proposed base stations from the first set of proposed base stations that correspond to a highest one or more of the first spectral interference values so that remaining ones of the first spectral interference values corresponding to the second set of proposed base stations total to less than or equal to the threshold value.

13. The system of claim 9, wherein when executing the computer executable instructions the at least one processor is configured to obtain first empirical spectral interference values for the first proper subset of the second set of proposed base stations by:
   setting up testing equipment for each proposed base station in the first proper subset of the second set of proposed base stations;
   measuring spectral interference with the test equipment for each of the proposed base station in the first proper subset of the second set of proposed base stations to obtain the first empirical spectral interference values.

14. The system of claim 9, wherein when executing the computer executable instructions the at least one processor is configured to compare the first empirical spectral interference values with the subset of the first modeled spectral interference values that correspond with the first proper subset of the second set of proposed base stations by:
   accumulating the first empirical spectral interference values to obtain a total empirical spectral interference value;
   accumulating the subset of the first modeled spectral interference values that correspond with the first proper subset of the second set of proposed base stations to obtain a total modeled spectral interference value;
   calculating the total empirical spectral interference value minus the total modeled spectral interference value to obtain a difference value; and
   determining whether the difference value is greater than a threshold value.

15. The system of claim 14, wherein when executing the computer executable instructions the at least one processor is configured to update the second set of proposed base stations as base stations to be set up based on the comparison by:
   removing one or more proposed base stations in the first proper subset from the second set of proposed base stations that correspond to a highest one or more of the first spectral interference values so that remaining ones of the first empirical spectral interference values corresponding to the second set of proposed base stations total to less than or equal to the threshold value.

16. The system of claim 9, wherein when executing the computer executable instructions the at least one processor is further configured to transmit instructions to install the updated second set of proposed base stations to installation personnel.

17. A non-transitory computer readable medium that stores computer executable instructions, wherein when at least one processor executes the computer executable instructions, the at least one processor is configured to:
   obtain a spectral interference model for a first set of proposed base stations;
   implement the spectral interference model for the first set of proposed base stations to calculate first modeled spectral interference values, wherein each of the first modeled spectral interference values indicates a spectral interference value for a corresponding one of the first set of proposed base stations;
   update the first set of proposed base stations based on the first spectral interference values to obtain a second set of proposed base stations;
   obtain first empirical spectral interference values for a first proper subset of the second set of proposed base stations;
   compare the first empirical spectral interference values with a subset of the first modeled spectral interference values that correspond with the first proper subset of the second set of proposed base stations; and update the second set of proposed base stations as base stations to be set up based on the comparison.

18. The non-transitory computer readable medium of claim 17, wherein, when executing the computer executable instructions the at least one processor is configured to obtaining the spectral interference model for a first set of proposed base stations by:

for each proposed base station of the first set of proposed base stations, defining more than one of the following:

a location of the proposed base station, an antenna height of an antenna of the proposed base station, transmission power of the proposed base station, an azimuth for the antenna of the proposed base station, a zenith of an antenna of the proposed base station.

19. The non-transitory computer readable medium of claim 18, wherein when executing the computer executable instructions the at least one processor is configured to obtain the spectral interference model for a first set of proposed base stations by:

obtaining a digital map that digitally describes a topography surrounding the first set of proposed base stations.

20. The non-transitory computer readable medium of claim 18, wherein when executing the computer executable instructions the at least one processor is further configured to transmit instructions to install the updated second set of proposed base stations to installation personnel.

* * * * *